US008856152B2

(12) United States Patent
Kim et al.

(10) Patent No.: US 8,856,152 B2
(45) Date of Patent: Oct. 7, 2014

(54) APPARATUS AND METHOD FOR VISUALIZING DATA

(75) Inventors: Keon Woo Kim, Daejeon (KR); Do Won Hong, Daejeon (KR); Sung Kyong Un, Daejeon (KR); Young Soo Kim, Daejeon (KR); Woo Yong Choi, Daejeon (KR); Sang Su Lee, Daejeon (KR); Joo Young Lee, Daejeon (KR); Su Hyung Jo, Daejeon (KR); Youn Hee Gil, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 84 days.

(21) Appl. No.: 13/488,826

(22) Filed: Jun. 5, 2012

(65) Prior Publication Data

US 2013/0159327 A1 Jun. 20, 2013

(30) Foreign Application Priority Data

Dec. 15, 2011 (KR) ........................ 10-2011-0135928

(51) Int. Cl.
*G06F 7/00* (2006.01)
*G06F 17/30* (2006.01)

(52) U.S. Cl.
USPC .......................................................... 707/755

(58) Field of Classification Search
USPC .................................. 707/718, 719, 743, 921
See application file for complete search history.

(56) References Cited

U.S. PATENT DOCUMENTS

| | | | | |
|---|---|---|---|---|
| 7,421,660 | B2 * | 9/2008 | Charnock et al. | 715/751 |
| 7,702,652 | B2 * | 4/2010 | Twig et al. | 707/770 |
| 2005/0076313 | A1 * | 4/2005 | Pegram et al. | 715/861 |
| 2007/0050340 | A1 * | 3/2007 | von Kaenel et al. | 707/3 |
| 2007/0124328 | A1 * | 5/2007 | Klein | 707/102 |
| 2007/0180385 | A1 * | 8/2007 | Somasundaram et al. | 715/738 |
| 2007/0288196 | A1 * | 12/2007 | Frank et al. | 702/151 |
| 2009/0013281 | A1 | 1/2009 | Helfman et al. | |
| 2009/0227269 | A1 * | 9/2009 | Frank et al. | 455/456.3 |
| 2009/0251472 | A1 * | 10/2009 | Antoine | 345/502 |
| 2009/0288164 | A1 * | 11/2009 | Adelstein et al. | 726/22 |
| 2010/0114941 | A1 * | 5/2010 | Von Kaenel et al. | 707/769 |
| 2010/0268691 | A1 * | 10/2010 | Grinstein et al. | 707/682 |
| 2010/0318929 | A1 * | 12/2010 | Hilton et al. | 715/769 |
| 2010/0332210 | A1 * | 12/2010 | Birdwell et al. | 703/22 |
| 2010/0332468 | A1 * | 12/2010 | Cantrell | 707/724 |
| 2011/0202539 | A1 * | 8/2011 | Salemann | 707/741 |
| 2011/0276592 | A1 * | 11/2011 | Gautama et al. | 707/769 |
| 2012/0005631 | A1 * | 1/2012 | B'Far et al. | 715/854 |
| 2012/0174001 | A1 * | 7/2012 | Friedman et al. | 715/763 |
| 2012/0191723 | A1 * | 7/2012 | Salemann | 707/741 |

OTHER PUBLICATIONS

Andrew Marrington et al., "Event-based Computer Profiling for the Forensic Reconstruction of Computer Activity", AusCERT2007 R&D Stream, May 2007, pp. 71-87, AusCERT.
Jens Olsson et al., "Computer forensic timeline visualization Tool", ScienceDirect: Digital Investigation, Sep. 2009, pp. S78-S87, vol. 6, Elsevier.

* cited by examiner

*Primary Examiner* — Robert Beausoliel, Jr.
*Assistant Examiner* — Nicholas Allen

(57) ABSTRACT

Proposed is a data visualizing apparatus for visualizing data as effectual information using a correlation between forensic data collected from various sources. The proposed data visualizing apparatus may visualize, as effectual information, single-source single-data, single-source multi-data, and multi-source multi-data.

17 Claims, 9 Drawing Sheets

APPARATUS AND METHOD FOR VISUALIZING DATA

CROSS-REFERENCE TO RELATED APPLICATIONS

This application claims priority to and the benefit of Korean Patent Application No. 10-2011-0135928 filed in the Korean Intellectual Property Office on Dec. 15, 2011, the entire contents of which are incorporated herein by reference.

TECHNICAL FIELD

The present invention relates to an apparatus and a method for visualizing data, and more particularly, to an apparatus and method for visualizing forensic data.

BACKGROUND ART

A digital forensic tool is focused on data collection and analysis and thus, does not provide a method of effectually expressing data. Therefore, to more efficiently transfer information to a user, forensic data needs to be embodied to include effectual information using a data visualization scheme.

Forensic data that may be a target to be visualized includes computer forensic data, portable forensic data using an external storage device such as a universal serial bus (USB), mobile device data including a smart phone, social network service (SNS) forensic data, and the like.

Collection of raw data for visualization of forensic data may be performed with respect to a variety of data from different types of sources. A plurality of data may be collected for each user even with respect to the same source. Even though data is collected from the same source, the collected data may have a different format based on a used collection tool.

Various correlations exist between data that is collected from a plurality of sources and has various formats. In order to analyze a forensic investigation or a user behavior, it is very important to visually express the various correlations. However, an existing forensic tool or forensic visualization tool does not provide a method of expressing the various correlations. Accordingly, an existing visualization method provides a method of expressing only data collected from a single source and has difficulty in mixing and thereby expressing data collected from a plurality of sources. In order to analyze an effectual forensic investigation or a user behavior, it is necessary to visually express individual data collected from a single data collecting source. Multiple data collected from multiple data sources also needs to be visually expressed, however, the existing forensic visualization tool has some constraints.

SUMMARY OF THE INVENTION

The present invention has been made in an effort to provide an apparatus and a method for visualizing data that are not limited to various sources and data formats.

An exemplary embodiment of the present invention provides an apparatus for visualizing data, including: a single-data collecting unit to collect plural single-data having different formats; a first multi-data generating unit to generate first multi-data using plural first single-data that is obtained from the collected plural single-data and has the same format; a second multi-data generating unit to generate second multi-data using at least one of the plural first single-data, plural second single-data having a format different from the format of the plural first single-data, and the generated plural first multi-data; and a data visualizer to visualize at least one of the collected plural single-data, the generated first multi-data, and the generated second multi-data.

The single-data collecting unit may include: a data obtaining unit to obtain plural data to be visualized among pre-stored plural data or to obtain plural data to be visualized from an external device; a data parser to parse the obtained plural data; a data generating unit to generate plural single-data by normalizing the parsed plural data; and a format-based data collecting unit to collect plural single-data having different formats from the generated plural single-data.

The single-data collecting unit may collect all the plural single-data having different formats from a single data collecting source, or may designate a format to each data collecting source and then, collect only single-data having the designated format from each data collecting source.

The first multi-data generating unit may include: a first data extracting unit to extract only plural single-data having any one format from among the collected plural single-data; a first data relationship prescribing unit to prescribe a relationship between the extracted plural single-data by sorting the extracted plural single-data based on a predetermined criterion; and a first data normalizing unit to generate the first multi-data by normalizing the relation-prescribed plural single-data. When data to be visualized is parsed, the first data extracting unit may collect the parsed data as plural single-data to be extracted. The first data relationship prescribing unit may prescribe the relationship between the plural single-data using a relationship between plural visualized data.

The second multi-data generating unit may include: a second data extracting unit to extract only the generated plural first multi-data, to extract only the plural second single-data, or to mix and thereby extract at least two of at least one first single-data, at least one first multi-data, and at least one second single-data; a second data relationship prescribing unit to prescribe a relationship between the extracted plural data by sorting the extracted plural data based on a predetermined criterion; and a second data normalizing unit to generate the second multi-data by normalizing the relation-prescribed plural data. When data to be visualized is parsed, the second data extracting unit may collect the parsed data as plural single-data to be extracted. When data to be visualized is parsed, the second data extracting unit may collect the parsed data as plural first multi-data or plural second multi-data to be extracted. The second data relationship prescribing unit may prescribe a relationship between the plural single-data using relationship between plural visualized data. The second data relationship prescribing unit may prescribe a relationship between the plural first multi-data, a relationship between the second multi-data, or a relationship between the plural first multi-data and the plural second multi-data using the relationship between the visualized plural data.

The data visualizer may statically or dynamically visualize data depending on whether user interaction exists. When dynamically visualizing data, the data visualizer may regenerate data to be visualized at predetermined time intervals and then, visualize the regenerated data.

Data that the data visualizer is to visualize may be forensic data.

Another exemplary embodiment of the present invention provides a method of visualizing data, including: collecting plural single-data having different formats; generating first multi-data using plural first single-data that is obtained from the collected plural single-data and has the same format; generating second multi-data using at least one of the plural first single-data, plural second single-data having a format different from the format of the plural first single-data, and the generated plural first multi-data; and visualizing at least one of the collected plural single-data, the generated first multi-data, and the generated second multi-data.

The collecting of the single-data may include: obtaining plural data to be visualized among pre-stored plural data or obtaining plural data to be visualized from an external device; parsing the obtained plural data; generating plural single-data by normalizing the parsed plural data; and collecting plural single-data having different formats from the generated plural single-data.

The collecting of the single-data may collect all the plural single-data having different formats from a single data collecting source, or may designate a format to each data collecting source and then, collect only single-data having the designated format from each data collecting source.

The generating of the first multi-data may include: extracting only plural single-data having any one format from among the collected plural single-data; prescribing a relationship between the extracted plural single-data by sorting the extracted plural single-data based on a predetermined criterion; and generating the first multi-data by normalizing the relation-prescribed plural single-data. When data to be visualized is parsed, the generating of the first multi-data may collect the parsed data as plural single-data to be extracted. The prescribing of the relationship between plural first data may prescribe the relationship between the single-data using a relationship between plural visualized data.

The generating of the second multi-data may include: extracting only the generated plural first multi-data, extracting only the plural second single-data, or mixing and thereby extracting at least two of at least one first single-data, at least one first multi-data, and at least one second single-data; prescribing a relationship between the extracted plural data by sorting the extracted plural data based on a predetermined criterion; and generating the second multi-data by normalizing the relation-prescribed plural data. When data to be visualized is parsed, the extracting of the second data may collect the parsed data as plural single-data to be extracted. When data to be visualized is parsed, the extracting of the second data may collect the parsed data as plural first multi-data or plural second multi-data to be extracted. The prescribing of the relationship between plural second data may prescribe the relationship between the plural single-data using a relationship between plural visualized data. The prescribing of the relationship between plural second data may prescribe a relationship between the plural first multi-data, a relationship between the plural second multi-data, or a relationship between the plural first multi-data and the plural second multi-data using the relationship between the plural visualized data.

The visualizing of the data may statically or dynamically visualize data depending on whether user interaction exists. The visualizing of the data may regenerate data to be visualized at predetermined time intervals and then, visualize the regenerated data when dynamically visualizing data.

Data to be visualized in the visualizing of the data may be forensic data.

According to exemplary embodiments of the present invention, it is possible to visualize data as effectual information using a correlation between forensic data collected from various sources. It is possible to visualize, as effectual information, each of single-source single-data (single data that is collected from a single data collecting source), single-source multi-data (multiple data that is collected from a single data collecting source), and multi-source multi-data (multiple data that is collected from multiple data collecting sources). Even though data is combined between different sources and different users, it is possible to visualize the combined data as effectual information using correlation included in the combined data.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
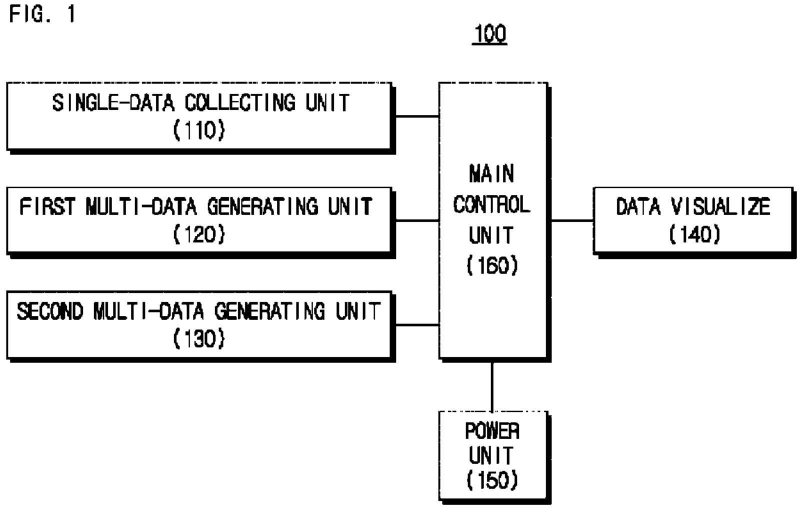
FIG. 1 is a block diagram schematically illustrating a data visualizing apparatus according to an exemplar embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 2A:
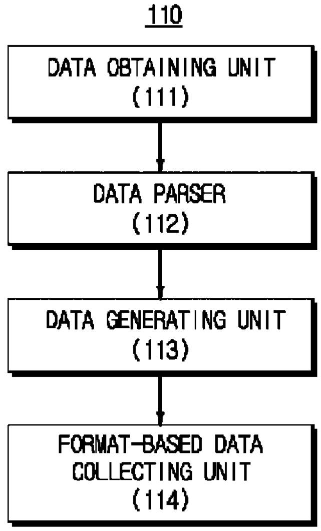
FIGS. 2A, 2B, and 2C are block diagrams illustrating an internal configuration of the data visualizing apparatus of FIG. 1 in detail.
Figure 2B:
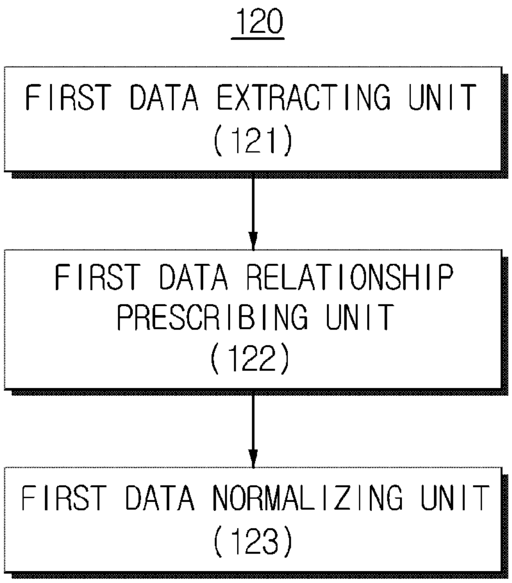
Figure 2C:
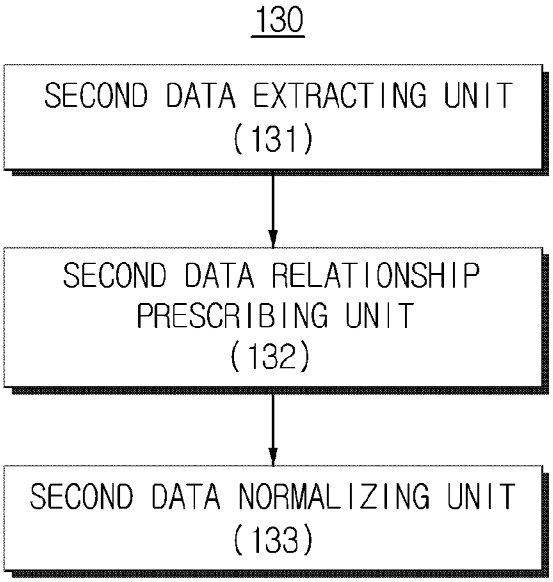

FIG. 1 is a block diagram schematically illustrating a data visualizing apparatus 100 according to an exemplar embodiment of the present invention. FIGS. 2A, 2B, and 2C are block diagrams illustrating an internal configuration of the data visualizing apparatus 100 of FIG. 1 in detail. Hereinafter, a description will be made with reference to FIGS. 1 and 2.

Referring to FIG. 1, the data visualizing apparatus 100 includes a single-data collecting unit 110, a first multi-data generating unit 120, a second multi-data generating unit 130, a data visualizer 140, a power unit 150, and a main control unit 160.

The data visualizing apparatus 100 is an apparatus for visualizing data as effectual information using a correlation between forensic data that is collected from various sources. The data visualizing apparatus 100 may visualize, as effectual information, single-source single-data, single-source multi-data, and multi-source multi-data. The single-source single-data indicates single-data that is collected from a single data collecting source, the single-source multi-data indicates multiple data that is collected from a single data collecting source, and the multi-source multi-data indicates multiple data that is collected from multiple data collecting sources. The data visualizing apparatus 100 may visualize, for example, forensic data as effectual information.

The single-data collecting unit 110 functions to collect plural single-data having different formats. The first multi-data generating unit 120 functions to generate first multi-data using plural first single-data that is obtained from the collected plural single-data and has the same format. The second multi-data generating unit 130 functions to generate second multi-data using at least one of the plural first single-data, plural second single-data having a format different from the format of the plural first single-data, and the generated plural first multi-data. The data visualizer 140 functions to visualize at least one of the collected plural single-data, the generated first multi-data, and the generated second multi-data. The power unit 150 functions to supply power to each of the constituent elements that constitute the data visualizing apparatus 100. The main control unit 160 functions to control the entire operation of each of the constituent elements that constitute the data visualizing apparatus 100.

Single-data is data having a predetermined format and in the present exemplary embodiment, single-source single-data corresponds to the single-data. The single-source single-data will be described later. First multi-data is data that is obtained by combining plural data having the same format. In the present exemplar embodiment, single-source multi-data corresponds to the first multi-data. The single-source multi-data will be described later. Second multi-data is data that is obtained by combining data having different formats. In the present exemplary embodiment, multi-source multi-data corresponds to the second multi-data. The multi-source multi-data will be described later.

The single-data collecting unit 110 is configured to perform the same function as a forensic data collector. The forensic data collector will be described later. The first multi-data generating unit 120 is configured to perform the same function as a single-source forensic data analyzer. The single-source forensic data analyzer will be described later. The second multi-data generating unit 130 is configured to perform the same function as a multi-source forensic data analyzer. The multi-source forensic data analyzer will be described later. The data visualizer 140 is configured to perform the same function as a forensic data visualizer. The forensic data visualizer will be described later.

As shown in FIG. 2A, the single-data collecting unit 110 may include a data obtaining unit 111, a data parser 112, a data generating unit 113, and a format-based data collecting unit 114. The data obtaining unit 111 functions to obtain plural data to be visualized among pre-stored plural data or to obtain plural data to be visualized from an external device. The data parser 112 functions to parse the obtained plural data. The data generating unit 113 functions to generate plural single-data by normalizing the parsed plural data. The format-based data collecting unit 114 functions to collect plural single-data having different formats from the generated plural single-data.

The data obtaining unit 111 is configured to perform the same function as a data import unit. The data import unit will be described later. The data parser 112 is configured to perform the same function as a data parsing unit. The data parsing unit will be described later. The data generating unit 113 is configured to perform the same function as a first data table making unit. The first data table making unit will be described later.

The single-data collecting unit 110 may collect all the plural single-data having different formats from a single data collecting source. The single-data collecting unit 110 may designate a format to each data collecting source and then, collect only single-data having the designated format from each data collecting source.

As shown in FIG. 2B, the first multi-data generating unit 120 may include a first data extracting unit 121, a first data relationship prescribing unit 122, and a first data normalizing unit 123. The first data extracting unit 121 functions to extract only plural single-data having any one format from among the collected plural single-data. The first data relationship prescribing unit 122 functions to prescribe a relationship between the extracted plural single-data by sorting the extracted plural single-data based on a predetermined criterion. The first data normalizing unit 123 functions to generate the first multi-data by normalizing the relation-prescribed plural single-data.

The first data extracting unit 121 is configured to perform the same function as a single-source data gathering unit. The single-source data gathering unit will be described later. The first data relationship prescribing unit 122 is configured to perform the same function as a single-source data processing unit. The single-source data processing unit will be described later. The first data normalizing unit 123 is configured to perform the same function as a second data table making unit. The second data table making unit will be described later.

When data to be visualized is parsed, the first data extracting unit 121 may collect the parsed data as plural single-data to be extracted. The first data relationship prescribing unit 122 may prescribe the relationship between the plural single-data using a relationship between plural visualized data.

As shown in FIG. 2C, the second multi-data generating unit 130 may include a second data extracting unit 131, a second data relationship prescribing unit 132, and a second data normalizing unit 133. The second data extracting unit 131 functions to extract only the generated plural first multi-data, to extract only the plural second single-data, or to mix and thereby extract at least two of at least one first single-data, at least one first multi-data, and at least one second single-data. The second data relationship prescribing unit 132 functions to prescribe a relationship between the extracted plural data by sorting the extracted plural data based on a predetermined criterion. The second data normalizing unit 133 functions to generate the second multi-data by normalizing the relation-prescribed plural data.

The second data extracting unit 131 is configured to perform the same function as a multi-source data gathering unit. The multi-source data gathering unit will be described later. The second data relationship prescribing unit 132 is configured to perform the same function as a multi-source data processing unit. The multi-source data processing unit will be described later. The second data normalizing unit 133 is configured to perform the same function as a third data table making unit. The third data table making unit will be described later.

When data to be visualized is parsed, the second data extracting unit 131 may collect the parsed data as plural single-data to be extracted. When data to be visualized is parsed, the second data extracting unit 131 may collect the parsed data as plural first multi-data or plural second multi-data to be extracted. The second data relationship prescribing unit 132 may prescribe a relationship between the plural single-data using relationship between plural visualized data. The second data relationship prescribing unit 132 may prescribe a relationship between the plural first multi-data, a relationship between the second multi-data, or a relationship between the plural first multi-data and the plural second multi-data using relationship between visualized plural data.

The data visualizer 140 may statically or dynamically visualize data depending on whether user interaction exists. In the present exemplary embodiment, the above function may be performed by a data visualizing unit. The data visualizing unit will be described later.

When dynamically visualizing data, the data visualizer 140 may regenerate data to be visualized at predetermined time intervals and then, visualize the regenerated data. In the present exemplary embodiment, the above function may be performed by a data request unit. The data request unit will be described later.

Next, a forensic data visualizing apparatus will be described as an embodiment of the data visualizing apparatus 100. Hereinafter, a method of configuring a forensic data visualizing apparatus for visualizing a correlated relationship between forensic data collected from various sources, and visualizing and thereby expressing single-source single-data, single-source multi-data, and multi-source multi-data in the configured forensic data visualizing apparatus will be described.

Figure 3:
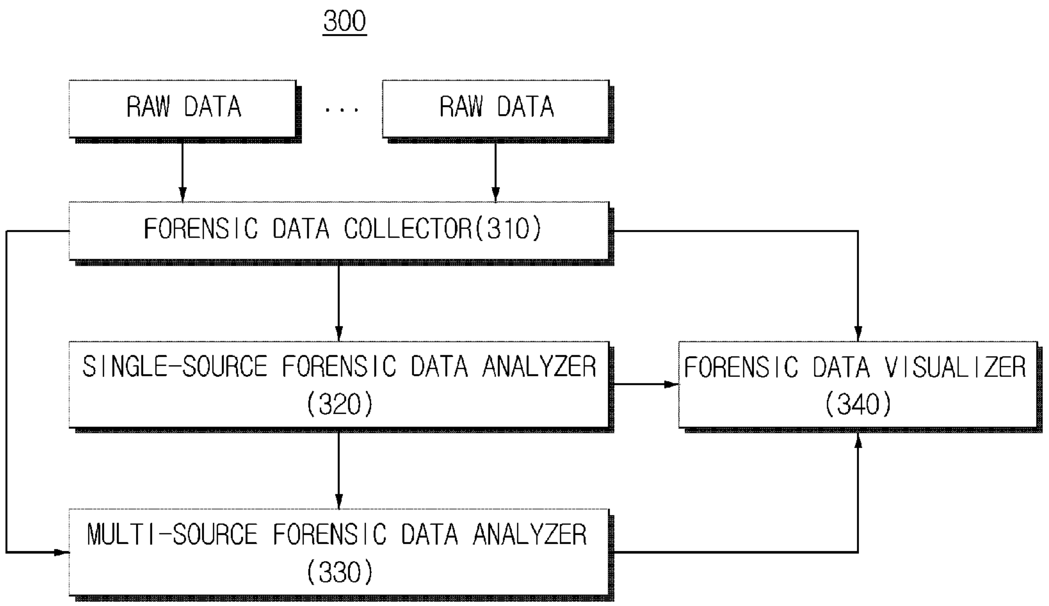
FIG. 3 is a block diagram schematically illustrating an internal configuration of a forensic data visualizing apparatus.

FIG. 3 is a block diagram schematically illustrating an internal configuration of a forensic data visualizing apparatus 300. Referring to FIG. 3, the forensic data visualizing apparatus 300 includes a forensic data collector 310, a single-source forensic data analyzer 320, a multi-source forensic data analyzer 330, and a forensic data visualizer 340. In the above configuration, the forensic data collector 310, the single-source forensic data analyzer 320, and the multi-source forensic data analyzer 330 function to perform data transformation. The forensic data visualizer 340 functions to perform visual mapping and a view transformation.

Figure 4:
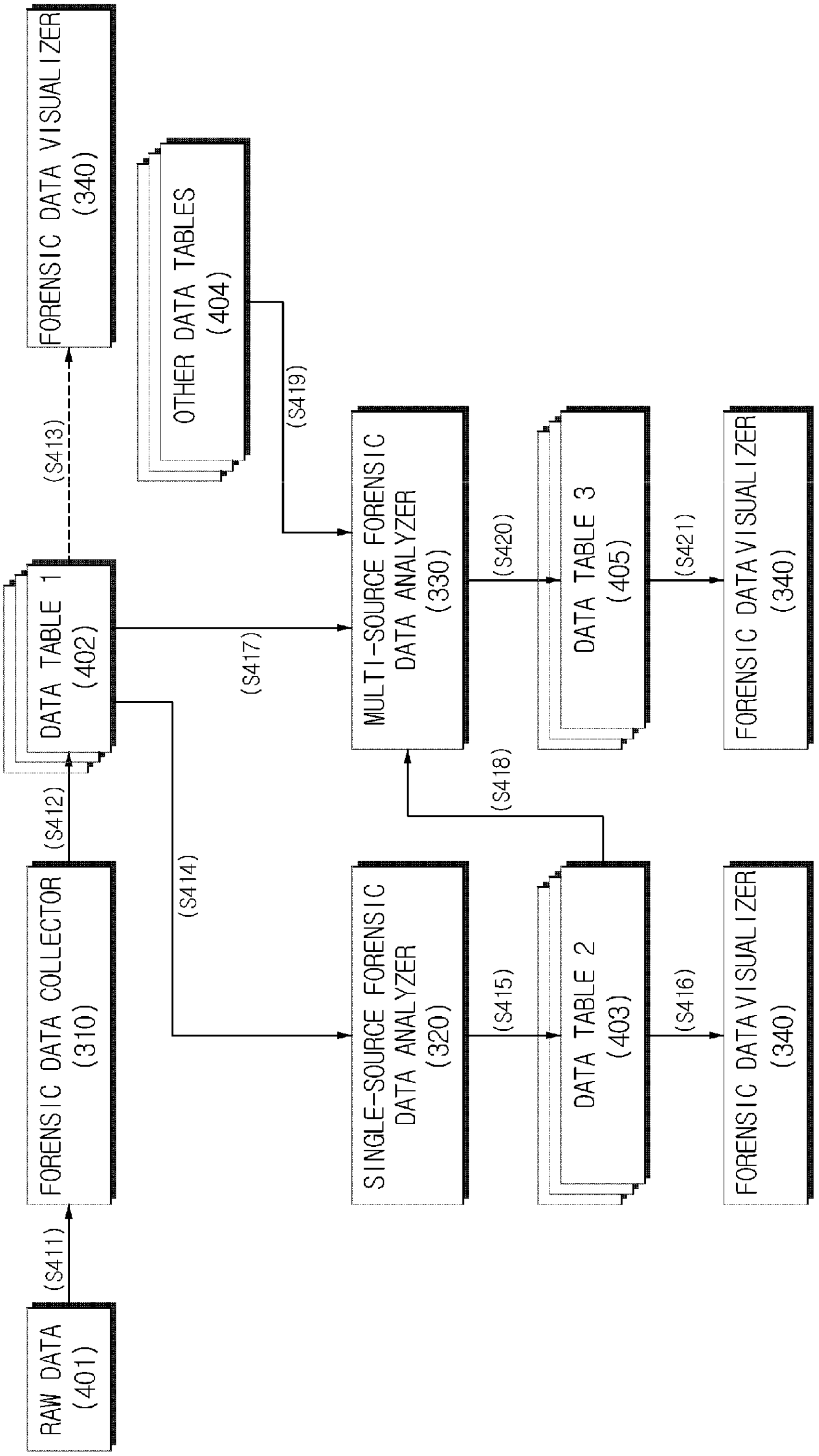
FIG. 4 is a diagram showing a process of transforming forensic data.

A process of transforming forensic data is shown in FIG. 4. FIG. 4 is a diagram showing a process of transforming forensic data. Hereinafter, a description will be made with reference to FIGS. 3 and 4.

A forensic data transforming function includes a data collecting function of constructing visualization data available in a visualization tool from raw data 401, a data analyzing function of generating new visualization data by analyzing collected data, a function of generating a data table by normalizing data, and the like. For the above operation, the forensic data collector 310 collects single-data from a single source. That is, the forensic data collector 310 collects the raw data 401 from a single data collecting source (S411) and thereby generates a data table 1 402 (S412). Using the data table 1 402, visualization expression may be performed in the forensic data visualizer 340 (S413). The single-source forensic data analyzer 320 analyzes multi-data from a single source. That is, the single-source forensic data analyzer 320 processes table-in data from the data table 1 402 that is generated from the same source (S414) and thereby generates a plurality of new data tables 2 403 (S415). Using the data table 2 403, visualization expression may be performed in the forensic data visualizer 340 (S416). The multi-source forensic data analyzer 330 analyzes multi-data from multiple sources. That is, the multi-source forensic data analyzer 330 functions to process data of tables from various sources of the data table 1 402 (S417), the data table 2 403 (S418), and other data tables 404 (S419) and to thereby generate a plurality of new data tables 3 405 (S420). Using the data table 3 405, visualization expression may be performed in the forensic data visualizer 340 (S421).

The raw data 401 to be visualized is data that is output using a forensic tool or pre-stored forensic file data. The raw data 401 may be stored in a single platform of a personal computer (PC), a portable device, and the like, and may also be stored in a distributed platform such as a cloud or a distributed computer. A result from a forensic tool may be stored in an existing repository and then be used later for visualization. The forensic data collector 310, the single-source forensic data analyzer 320, and the multi-source forensic data analyzer 330 may be modules that respectively independently exist and may be provided in a form in which three functions are integrated.

Figure 5:
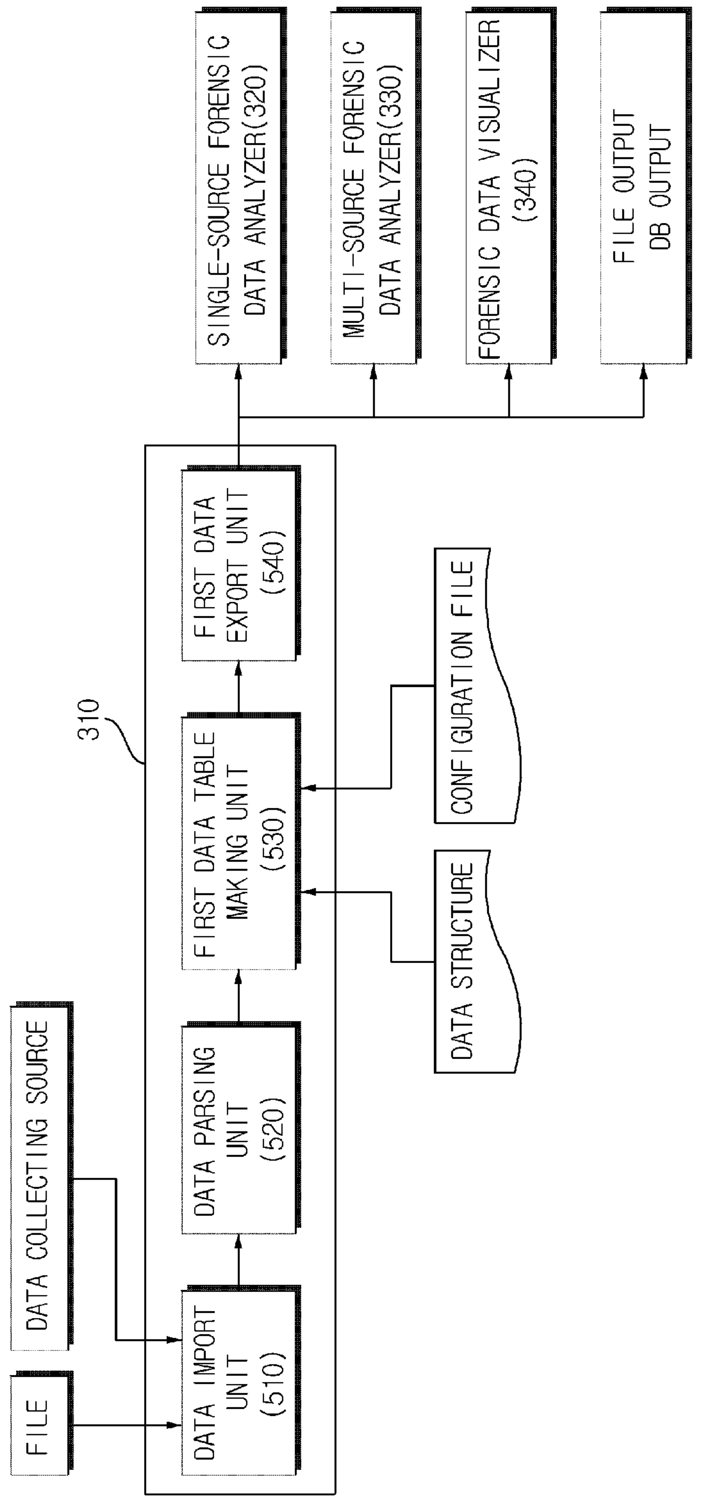
FIG. 5 is a block diagram schematically illustrating an internal configuration of a forensic data collector.

FIG. 5 is a block diagram schematically illustrating an internal configuration of the forensic data collector 310. The forensic data collector 310 includes a data import unit 510, a data parsing unit 520, a first data table making unit 530, and a first data export unit 540.

The data import unit 510 imports data to be visualized using a file import or a transmission control protocol (TCP)/user datagram protocol (UDP) interface. Target data is data that is output using a visualization tool or stored file data, and is imported using an extensible markup language (XML) reader, a comma separated value (CSV) reader, a structured query language (SQL) reader, and the like.

The data parsing unit 520 functions to parse visualization data by extracting data to be visualized from raw data of various data formats. For a parser function, a method such as a CSV/txt parser, an XML parser, a SQL data parser, an MS-excel, grep, and the like, may be employed. The parsed data is used in the first data table making unit 530, the single-source forensic data analyzer 320, or the multi-source forensic data analyzer 330.

The first data table making unit 530 generates the data table 1 402 by normalizing forensic data. For example, the first data table making unit 530 generates the data table 1 402 such as a portable forensic data table, a mobile forensic data table, an online forensic data table, a computer forensic data table, and the like. Portable forensic data table 1 may include a system table, a web table, a universal serial bus (USB) table, a process table, a command table, a FileSearch table, a messenger table, a document table, a DocumentDeleted table, a time table, an integrated table, and the like, as an example. Types of mobile forensic data table 1 may include a basic table, a call history table, a message table, a phonebook table, a photo table, a video table, a memo table, a recorder table, an email table, a social network service (SNS) table, a navigation table, a time table, an integrated table, and the like, as an example. Online forensic data table 1 may include a WebPage table, WebMail table, a WebBlog table, a WebCafe table, an integrated table, and the like, as an example. The data table is transformed to a form of data that is available for visualization and has a structure of a table, a tree, a graph, and the like. A configuration file such as a predefined XML schema, CSV data table, a SQL database, and the like is applied.

The first data export unit 540 functions to export visualization data. Data is transferred to the single-source forensic data analyzer 320, the multi-source forensic data analyzer 330, or the forensic data visualizer 340. A normalized data table file may be an output in a form of CSV and XML file, or be a DB output. An output target is the data table 1 402 or parsed data.

Figure 6:
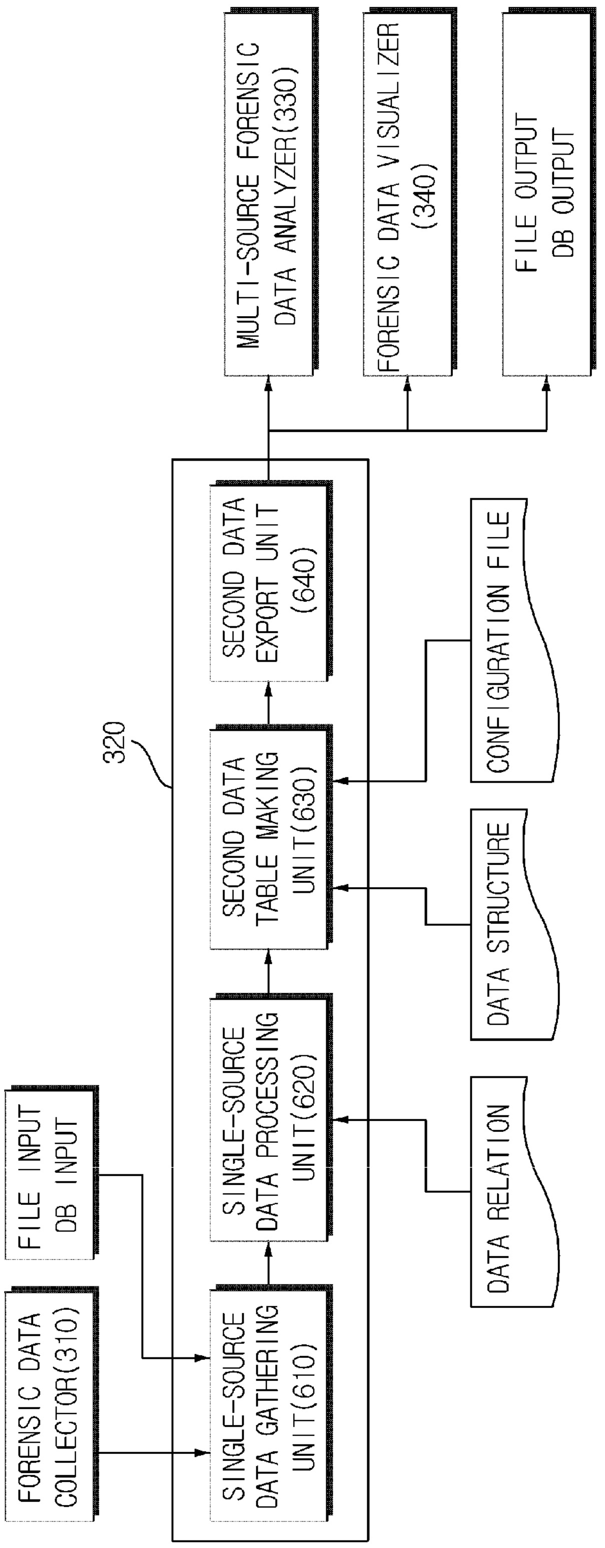
FIG. 6 is a block diagram schematically illustrating an internal configuration of a single-source forensic data analyzer.

FIG. 6 is a block diagram schematically illustrating an internal configuration of the single-source forensic data analyzer 320. Referring to FIG. 6, the single-source forensic data analyzer 320 includes a single-source data gathering unit 610, a single-source data processing unit 620, a second data table making unit 630, and a second data export unit 640.

The single-source data gathering unit 610 has three functions as follows. First, the single-source data gathering unit 610 collects a single data table 1 by collecting a single-source single-data table. Second, the single-source data gathering unit 610 collects a plurality of data tables 1 by collecting a single-source multi-data table. The single-source data gathering unit 610 selectively requests data and stores data corresponding to the request. Third, the single-source data gathering unit 610 collects parsed data of the forensic data collector 310. This data is not in a form of the data table 1.

The single-source data processing unit 620 processes a defined data relation, that is, data relationship by sorting data from a single table, by selecting only a predetermined attribute or field, or by extracting only a field including only a predetermined word. Specific functions are as follows. First, the single-source data processing unit 620 processes single-source single-data. The single-source data processing unit 620 reprocesses data for generating a plurality of data tables 2 from a single data table 1 and reflects a data relationship with respect to the single data table 1. Second, the single-source data processing unit 620 processes single-source multi-data. The single-source data processing unit 620 reprocesses data for generating a plurality of data tables 2 from a plurality of data tables 1, and reflects a data relationship with respect to the plurality of data tables 1. Third, the single-source data processing unit 620 processes parsed data of the forensic data collector 310. The single-source data processing unit 620 reprocesses data by reflecting a data relationship with respect to the parsed data of the forensic data collector 310. Fourth, the single-source data processing unit 620 reprocesses data by reflecting an interaction from the forensic data visualizer 340.

The second data table making unit 630 normalizes a new visualization data table by applying a configuration file and a data structure. Detailed functions are as follows. First, the second data table making unit 630 generates the data table 2 403 of single-source single-data. That is, the second data table making unit 630 configures a plurality of data tables 2 403 from a single data table 1. Second, the second data table making unit 630 generates the data table 2 403 of single-source multi-data. This is to configure a plurality of data tables 2 from a plurality of data tables 1. Third, the second data table making unit 630 generates the plurality of data tables 2 from parsed data of the forensic data collector 310.

The second data export unit 640 exports visualization data. The second data export unit 640 transfers data to the multi-source forensic data analyzer 330 or the forensic data visualizer 340. Data may be output in a form of a file or a DB for future use instead of being immediately used for visualization.

Figure 7:
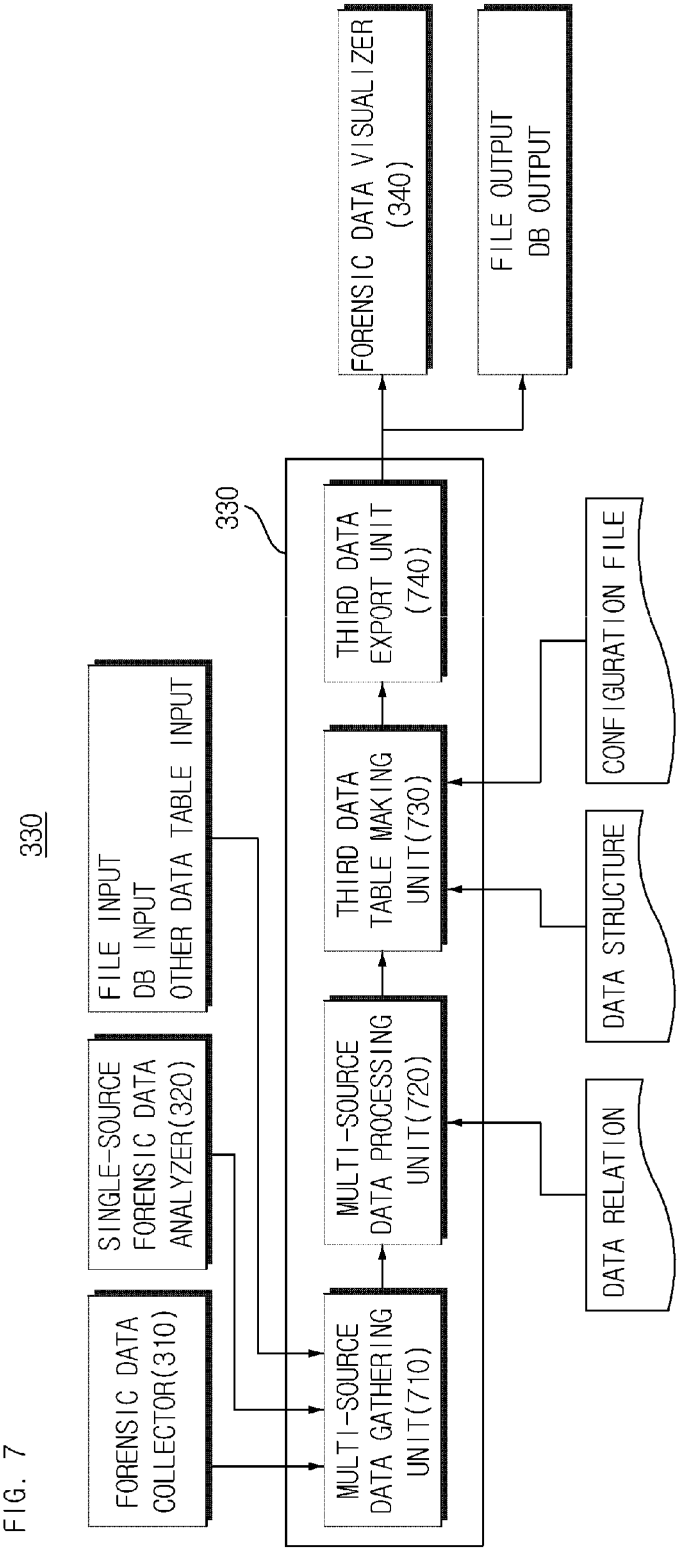
FIG. 7 is a block diagram schematically illustrating an internal configuration of a multi-source forensic data analyzer.

FIG. 7 is a block diagram schematically illustrating an internal configuration of the multi-source forensic data analyzer 330. Referring to FIG. 7, the multi-source forensic data analyzer 330 includes a multi-source data gathering unit 710, a multi-source data processing unit 720, a third data table making unit 730, and a third data export unit 740.

The multi-source data gathering unit 710 has the following functions. First, the multi-source data gathering unit 710 collects a multi-source multi-data table. The multi-source data gathering unit 710 collects a plurality of data tables 1 from a plurality of forensic data collectors 310 or collects a plurality of data tables 2 from a plurality of single-source forensic data analyzers 320. The multi-source data gathering unit 710 selectively requests data and stores data corresponding to the request. Second, the multi-source data gathering unit 710 collects parsed data of the forensic data collector 310. Here, the multi-source data gathering unit 710 collects parsed multi-source multi-data instead of collecting a data table. Third, the multi-source data gathering unit 710 collects data in a form of a file or a DB. The data is in a form of a file or DB output result of the forensic data collector 310 and the single-source forensic data analyzer 320.

The multi-source data processing unit 720 processes a defined data relation, that is, data relationship by sorting data from a plurality of tables, by extracting predetermined data from the plurality of tables, and the like. Detailed functions are as follow. First, the multi-source data processing unit 720 processes multi-source multi-data. The multi-source data processing unit 720 reprocesses data for generating a plurality of new data tables 3 from a plurality of data tables 1 and data tables 2, and existing different data tables 404, or reflects a data relationship with respect to the plurality of data tables 1 and data tables 2 from different sources. Second, the multi-source data processing unit 720 reprocesses data by reflecting a data relationship with respect to parsed data of the forensic data collector 310. Third, the multi-source data processing unit 720 reprocesses data by reflecting an interaction from the forensic data visualizer 340.

The third data table making unit 730 normalizes a new visualization data table by applying a configuration file and a data structure. Detailed functions are as follow. First, the third data table making unit 730 generates the data table 3 405 of single-source multi-data. This is to configure a plurality of data tables 3 405 from a plurality of data tables 1, 2, and 3. Second, the third data table making unit 730 generates a data table 3 of parsed data of the forensic data collector 310. It is to configure the plurality of data tables 3 405 from parsed data of a plurality of forensic data collectors 310 from different sources. For example, the data tables 3 are generated from portable data tables 1 and 2, mobile data tables 1 and 2, online data tables 1 and 2, and computer data tables 1 and 2.

The third data export unit 740 exports data by transferring the data to the forensic data visualizer 340. Data may be output in a form of a file or a DB for future use instead of being immediately used for visualization.

Figure 8:
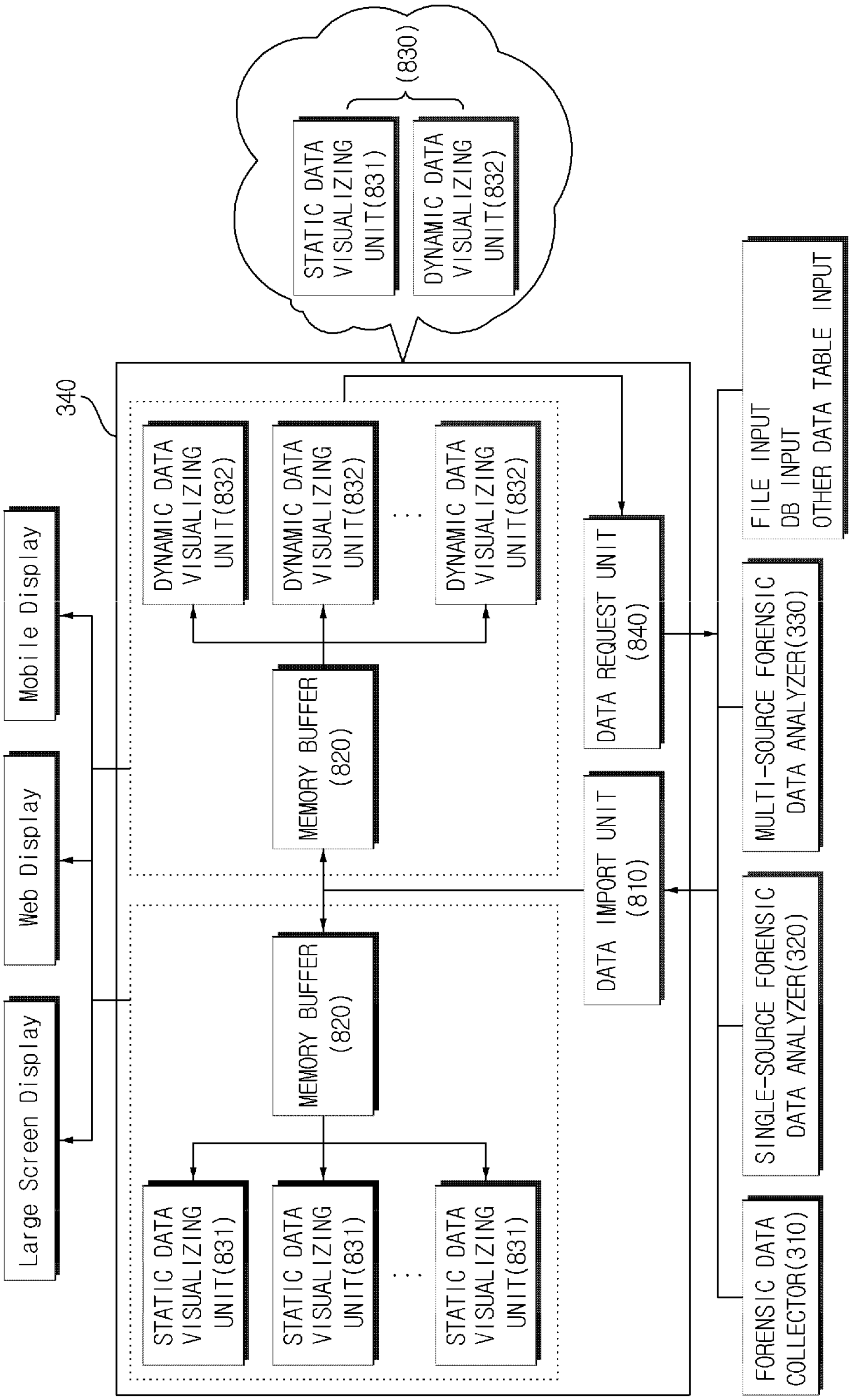
FIG. 8 is a block diagram illustrating an internal configuration of a forensic data visualizer.

FIG. 8 is a block diagram illustrating an internal configuration of the forensic data visualizer 340. The forensic data visualizer 340 needs to provide various visualization methods using data tables 1, 2, and 3, and also needs to provide a graphical user interface (GUI) familiar to users. The forensic data visualizer 340 needs to enable various analyses to be performed with respect to the same data. For the above operation, the forensic data visualizer 340 includes a data import unit 810, a memory buffer 820, a data visualizing unit 830, and a data request unit 840.

The data import unit 810 functions to receive data tables 1, 2, and 3 to be expressed. An input source includes the forensic data collector 310, the single-source forensic data analyzer 320, the multi-source forensic data analyzer 330, file/DB/other data inputs.

The memory buffer 820 provides a space for using the same memory buffer so that the same data table may be expressed using various methods.

The data visualizing unit 830 enables visualization using a variety of modeling with respect to a single data table. The data visualizing unit 830 provides various visual structures with respect to the same data table and also provides various visual views with respect to the same data table. Depending on whether data has dependency on time, the data visualizing unit 830 may be divided into a static data visualizing unit 831 and a dynamic data visualizing unit 832. In the static data visualizing unit 831, there is no user interaction. On the other hand, in the dynamic data visualizing unit 832, there is a user interaction and the dynamic data visualizing unit 832 needs to process many data tables at a high rate. A development environment and a visual structure may also vary depending on a display type (a large screen view, a mobile view, and a web view).

The data request unit 840 functions to request a new data table by reflecting user interaction. When reflecting a new data relationship by a user, actual data table transformation may be performed by the single-source forensic data analyzer 320 and the multi-source forensic data analyzer 330. To process dynamic data, the forensic data visualizer 340 needs to be integrated in a configuration of performing a data transforming function. If separated, the forensic data visualizer 340 needs to perform a data processing function by reflecting a data relation. To process static data, the forensic data visualizer 340 may be integrated with or separated from the data transforming function.

A display environment may be variously selected such as a large screen view, a web view, a mobile view, and the like.

Figure 9:
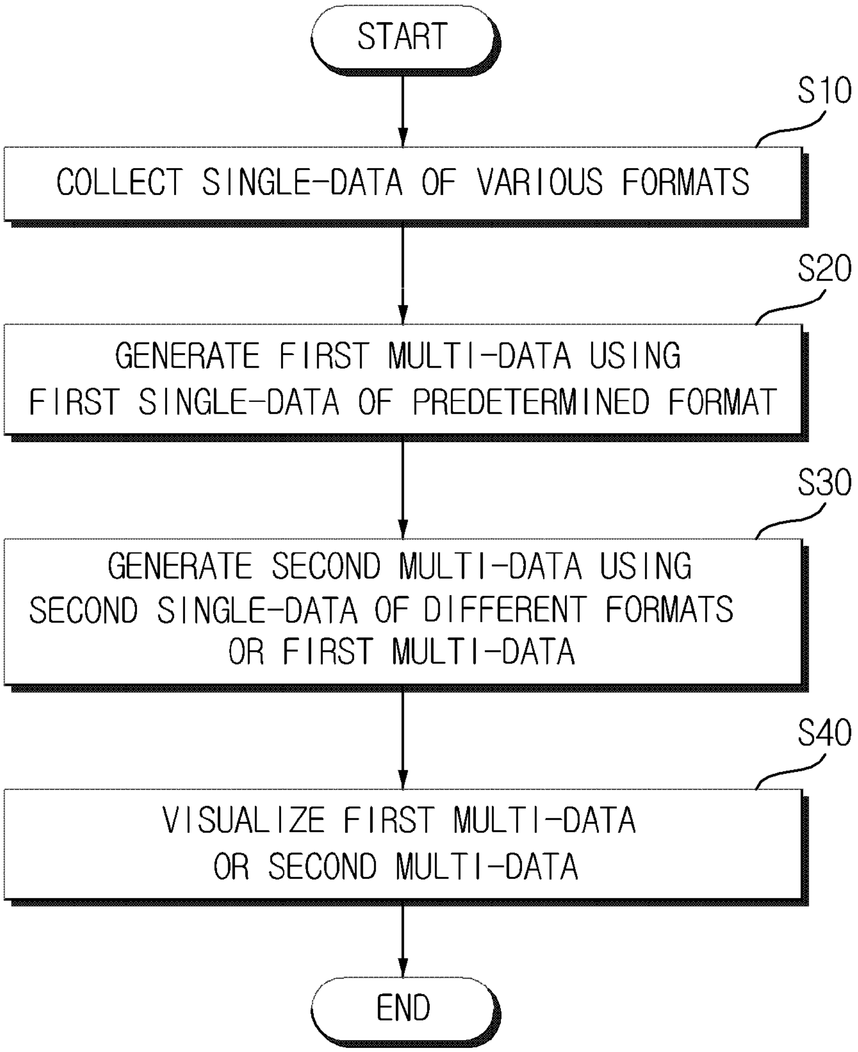
FIG. 9 is a flowchart illustrating a data visualizing method according to an exemplary embodiment of the present invention.

Hereinafter, a data visualizing method of the data visualizing apparatus 100 will be described. FIG. 9 is a flowchart illustrating a data visualizing method according to an exemplary embodiment of the present invention. A description will be made with reference to FIGS. 1, 2A, 2B, 2C and 9.

Initially, the single-data collecting unit 110 collects plural single-data having various formats (single-data collecting operation S10). The single-data collecting unit 110 may collect all the plural single-data having different formats from a single data collecting source, or may designate a format to each data collecting source and then, collect only single-data having the designated format from each data collecting source.

Single-data collecting operation S10 may be performed specifically as follows. Initially, the data obtaining unit 111 obtains plural data to be visualized among pre-stored plural data or obtains plural data to be visualized from an external device. Next, the data parser 112 parses the obtained data. Next, the data generating unit 113 generates plural single-data by normalizing the parsed plural data. Next, the format-based data collecting unit 114 collects plural single-data having different formats from the generated plural single-data.

After single-data collecting operation S10, the first multi-data generating unit 120 generates first multi-data using plural first single-data that is obtained from the collected plural single-data and has the same format (first multi-data generating operation S20).

First multi-data generating operation S20 may be performed as follows. Initially, the first data extracting unit 121 extracts only plural single-data having any one format from among the collected plural single-data. In this instance, when data to be visualized is parsed, the first data extracting unit 121 may collect the parsed data as plural single-data to be extracted. Next, the first data relationship prescribing unit 122 prescribes a relationship between the extracted plural single-data by sorting the extracted plural single-data based on a predetermined criterion. The first data relationship prescribing unit 122 may prescribe the relationship between the plural single-data using a relationship between visualized plural data. Next, the first data normalizing unit 123 generates the first multi-data by normalizing the relation-prescribed plural single-data.

After first multi-data generating operation S20, the second multi-data generating unit 130 generates second multi-data using at least one of the plural first single-data, plural second single-data having a format different from the format of the plural first single-data, and the generated plural first multi-data (second multi-data generating operation S30).

Second multi-data generating operation S30 may be performed as follows. Initially, the second data extracting unit 131 extracts only the generated plural first multi-data, extracts only the plural second single-data, or mixes and thereby extracts at least two of at least one first single-data, at least one first multi-data, and at least one second single-data. In this instance, when data to be visualized is parsed, the second data extracting unit 131 may collect the parsed data as plural single-data to be extracted. When data to be visualized is parsed, the second data extracting unit 131 may collect the parsed data as plural first multi-data or plural second multi-data to be extracted.

Next, the second data relationship prescribing unit 132 prescribes relationship between the extracted plural data by sorting the extracted plural data based on a predetermined criterion. In this instance, the second data relationship prescribing unit 132 may prescribe a relationship between the plural single-data using relationship between visualized plural data. The second data relationship prescribing unit 132 may prescribe a relationship between the plural first multi-data, a relationship between the plural second multi-data, or a relationship between the plural first multi-data and the plural second multi-data using the relationship between visualized plural data.

Next, the second data normalizing unit 133 generates the second multi-data by normalizing the relation-prescribed plural data.

After second multi-data generating operation S30, the data visualizer 140 visualizes at least one of the collected plural single-data, the generated first multi-data, and the generated second multi-data (data visualizing operation S40). The data visualizer 140 may statically or dynamically visualize data depending on whether user interaction exists. When dynamically visualizing data, the data visualizer 140 may regenerate data to be visualized at predetermined time intervals and then, visualize the regenerated data. Data visualized in data visualizing operation S40 may be, for example, forensic data.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for visualizing data, comprising:
a single-data collecting unit to collect plural single-data having a first format and having a second format;
a first multi-data generating unit to generate first multi-data from a first source using plural first single-data, wherein the plural first single-data is obtained from the collected plural single-data having the first format;
a second multi-data generating unit to generate second multi-data from a second source using at least one of the plural first single-data, plural second single-data, and the generated plural first multi-data, wherein the plural second single-data has a second format different from the first format; and
a data visualizer to visualize at least one of the collected plural single-data, the first multi-data generated from the first source, and the second multi-data generated from the second source,
wherein the first multi-data generating unit comprises:
a first data extracting unit to extract only plural single-data having any one format from among the collected plural single-data;
a first data relationship prescribing unit to prescribe a relationship between the extracted plural single-data by sorting the extracted plural single-data based on a predetermined criterion comprising a selected predetermined attribute or field, or comprising only an extracted field including only a predetermined word; and
a first data normalizing unit to generate the first multi-data by normalizing the relation-prescribed plural single-data.

2. The apparatus of claim 1, wherein the single-data collecting unit comprises:
a data obtaining unit to obtain plural data to be visualized among pre-stored plural data or to obtain plural data to be visualized from an external device;
a data parser to parse the obtained plural data;
a data generating unit to generate plural single-data by normalizing the parsed plural data; and
a format-based data collecting unit to collect plural single-data having the first and second formats from the generated plural single-data.

3. The apparatus of claim 1, wherein the single-data collecting unit collects all the plural single-data having the first and second formats from a single data collecting source, or designates a format to each of a first data collecting source and a second data collecting source and then, collects only single-data having the designated format from each of the first data collecting source and the second data collecting source.

4. The apparatus of claim 1, wherein when data to be visualized is parsed, the first data extracting unit collects the parsed data as plural single-data to be extracted.

5. The apparatus of claim 1, wherein the first data relationship prescribing unit prescribes the relationship between the plural single-data using a relationship between visualized plural data.

6. The apparatus of claim 1, wherein the second multi-data generating unit comprises:
a second data extracting unit to extract only the generated plural first multi-data, to extract only the plural second single-data, or to mix and thereby extract at least two of at least one first single-data, at least one first multi-data, and at least one second single-data;
a second data relationship prescribing unit to prescribe a relationship between the extracted plural data by sorting the extracted plural data based on a predetermined criterion; and
a second data normalizing unit to generate the second multi-data by normalizing the relation-prescribed plural data.

7. The apparatus of claim 6, wherein when data to be visualized is parsed, the second data extracting unit collects the parsed data as plural single-data to be extracted.

8. The apparatus of claim 6, wherein the second data relationship prescribing unit prescribes a relationship between the plural single-data using relationship between visualized plural data.

9. The apparatus of claim 1, wherein the data visualizer statically or dynamically visualizes data depending on whether user interaction exists.

10. The apparatus of claim 9, wherein when dynamically visualizing data, the data visualizer regenerates data to be visualized at predetermined time intervals and then, visualizes the regenerated data.

11. The apparatus of claim 1, wherein data that the data visualizer is to visualize is forensic data.

12. A method of visualizing data, comprising:
collecting plural single-data having a first format and a second format;
generating first multi-data using plural first single-data from a first source, wherein the plural first single-data is obtained from the collected plural single-data having the first format;
generating second multi-data from a second source using at least one of the plural first single-data, plural second single-data, and the generated plural first multi-data, wherein the plural second single-data has a second format different from the first format; and
visualizing at least one of the collected plural single-data, the first multi-data from the first source, and the second multi-data generated from the second source, wherein the generating of the first multi-data comprises:
extracting only plural single-data having any one format from among the collected plural single-data;
prescribing a relationship between the extracted plural single-data by sorting the extracted plural single-data based on a predetermined criterion comprising a selected predetermined attribute or field, or comprising only an extracted field including only a predetermined word; and
generating the first multi-data by normalizing the relation-prescribed plural single-data.

13. The method of claim 12, wherein the collecting of the single-data comprises:
obtaining plural data to be visualized among pre-stored plural data or obtaining plural data to be visualized from an external device;
parsing the obtained plural data;
generating plural single-data by normalizing the parsed plural data; and
collecting plural single-data having the first and second formats from the generated plural single-data.

14. The method of claim 12, wherein the generating of the second multi-data comprises:
extracting only the generated plural first multi-data, extracting only the plural second single-data, or mixing and thereby extracting at least two of at least one first single-data, at least one first multi-data, and at least one second single-data;

prescribing a relationship between the extracted plural data by sorting the extracted plural data based on a predetermined criterion; and generating the second multi-data by normalizing the relation-prescribed plural data.

15. The method of claim 12, wherein the visualizing of the data statically or dynamically visualizes data depending on whether user interaction exists.

16. The method of claim 15, wherein the visualizing of the data regenerates data to be visualized at predetermined time intervals and then, visualizes the regenerated data when dynamically visualizing data.

17. The method of claim 12, wherein data to be visualized in the visualizing of the data is forensic data.

* * * * *